(12) United States Patent
Höschen et al.

(10) Patent No.: US 11,594,711 B2
(45) Date of Patent: Feb. 28, 2023

(54) METHOD FOR FABRICATING A CURRENT COLLECTOR AND ASSOCIATED DEVICES

(71) Applicant: ARMOR, Nantes (FR)

(72) Inventors: Sjamme Karl Höschen, Reze (FR); Jean-François Noel Marcel Evrard, Vieillevigne (FR)

(73) Assignee: ARMOR, Nantes (FR)

( * ) Notice: Subject to any disclaimer, the term of this patent is extended or adjusted under 35 U.S.C. 154(b) by 217 days.

(21) Appl. No.: 16/514,392

(22) Filed: Jul. 17, 2019

(65) Prior Publication Data
US 2020/0035986 A1     Jan. 30, 2020

(30) Foreign Application Priority Data

Jul. 24, 2018  (FR) ...................... 18 56832

(51) Int. Cl.
| H01M 4/64 | (2006.01) |
| H01M 4/04 | (2006.01) |
| H01M 4/66 | (2006.01) |
| H01M 10/052 | (2010.01) |

(52) U.S. Cl.
CPC ....... H01M 4/0404 (2013.01); H01M 4/0416 (2013.01); H01M 4/661 (2013.01); H01M 4/667 (2013.01); H01M 10/052 (2013.01)

(58) Field of Classification Search
None
See application file for complete search history.

(56) References Cited

U.S. PATENT DOCUMENTS

| 2010/0224671 A1 | 9/2010 | Scheuerman et al. |
| 2010/0326962 A1* | 12/2010 | Calla ............ B23K 9/0956 219/76.14 |
| 2013/0022865 A1 | 1/2013 | Nishinaka et al. |
| 2016/0211500 A1 | 7/2016 | Lee et al. |
| 2017/0225275 A1* | 8/2017 | Hwang ............ B23K 31/125 |
| 2018/0358608 A1* | 12/2018 | Mino ............ H01M 4/139 |

FOREIGN PATENT DOCUMENTS

| DE | 102011110694 A1 | 2/2013 |
| WO | 2016030169 A1 | 3/2016 |

OTHER PUBLICATIONS

Search Report for French Application No. FR 18 56832 dated Apr. 4, 2019.

* cited by examiner

*Primary Examiner* — Lucas J. O'Donnell
(74) *Attorney, Agent, or Firm* — Pearne & Gordon LLP

(57) ABSTRACT

The present invention relates to a method for manufacturing a current collector for a battery or a supercapacitor, the manufacturing method comprising a phase of connecting a metal element and a metal strip coated with a coating, the coating being made of a coating material, the coating material being distinct from the strip material, the connecting phase comprising: a superimposing step of the strip and the metal element on a superposition surface, and a step of applying ultrasound by a sonotrode of an ultrasonic welder on the superimposing surface along a line for welding the superimposing surface.

8 Claims, 5 Drawing Sheets

METHOD FOR FABRICATING A CURRENT COLLECTOR AND ASSOCIATED DEVICES

This patent application claims the benefit of document FR18/56832 filed on Jul. 24, 2018 which is hereby incorporated by reference.

FIELD OF THE INVENTION

The present invention relates to a method of manufacturing a current collector. The present invention also relates to a corresponding splicing bench and to a current collector obtained by means of the connection method and to a system comprising such a collector.

BACKGROUND OF THE INVENTION

The batteries, i.e. a set of electrochemical accumulators, are used in many expanding fields such as electric vehicles.

An electrochemical accumulator typically comprises at least four elements: a positive electrode, a negative electrode, an electrolyte, as well as current collectors for each electrode. The assembly of a negative electrode and a current collector form an anode while the assembly of a positive electrode and a current collector form a cathode.

The operating principle of an accumulator is based on the reversible storage of electrical energy in chemical energy by the implementation of two separate but coupled electrochemical reactions. The positive and negative electrodes bathing in the electrolyte are the seat of the so-called faradic electrochemical reactions. The electrodes are, in particular, made of active materials for storing and releasing the ions via oxidation and reduction reactions.

During the discharge, the active material of the negative electrode oxidizes and, on the one hand, releases electrons that are routed through the current collector to the external circuit and, on the other hand, releases cations that migrate through the electrolyte to the positive electrode. Then, the electrons that have passed through the circuit using the energy and the cations, are captured by the active material of the positive electrode which is reduced. The energy density that an accumulator can release is a function of both the potential and the capacity of the electrochemical cell, both of which are directly related to the chemistry of the system. The potential of a battery is determined by the difference between the potentials of the oxidation-reduction reactions occurring simultaneously at the positive and negative electrodes.

It follows from the operation of an accumulator that the current collector provides electronic transfer. The present invention more specifically relates to the manufacture of current collectors which it is desirable to improve given the number of increasing applications using such elements.

The current collector is made of a sufficiently conductive material to provide electronic transfer, and by being light, thin, and mechanically-resistant serves as a substrate for the electrode. The conductive material forming the substrate may optionally be coated with at least one coating layer serving as an interface between the current collector and the electrode (cathode or anode) of the battery.

The method of manufacturing a coated current collector is a continuous process, known as an uncoiling process, in which a coating is deposited by coating the coiled substrate. Such a manufacturing method comprises the steps of supplying the substrate; forming a coating by depositing a suspension on the surface of the substrate; drying the deposited suspension. Such methods allow continuous and efficient manufacturing, since the substrate is presented in the form of a large roll of tens, hundreds or thousands of meters wound in the longitudinal direction, wherein the coating is applied almost continuously to the substrate while uncoiling the substrate. However, to meet the specifications in terms of coil length, it is necessary to be able to connect the transverse ends of two coated rolls in order to obtain a longer coil or cut off defective areas present in a coil and then reconnect the two ends created by the cutting off.

SUMMARY OF THE INVENTION

There is therefore a need for a method of manufacturing a current collector that is simpler to implement and improves the quality of the current collector.

For this, the present description relates to a method of manufacturing a current collector for a battery or a supercapacitor, the manufacturing method comprising a phase of connecting a metal element and a metal strip coated with a coating, the coating being made of a coating material, the coating material being distinct from the strip material, the connecting phase comprising a superposition step of the strip and the metal member on an overlapping surface, and a step of ultrasonically applying a sonotrode of an ultrasonic sealer to the superimposing surface along a line for welding the superimposing surface.

As part of the inventive step, the applicant was interested in current manufacturing processes whose most important elements are explained below.

Generally, the current collector is made of a metal strip having a thickness (dimension measured along the smallest dimension) of between 5 micrometers (µm) and 100 µm, preferably between 6 µm and 20 µm.

The material used for such a strip is, for example, iron, copper, aluminum, nickel, titanium or stainless steel.

Preferably, the material is non-ferrous, with aluminum and copper being the most common examples.

An aluminum strip is preferably produced by cold rolling while a copper strip is obtained by electro-deposition.

The strip is coated with at least one coating layer serving as an interface between the current collector and the electrode (cathode or anode) of the battery. The assembly of coating layers forms the coating. The metal material forming the strip serves the role of a substrate for the coating.

The function of the coating layer is, in particular, the optimization of the adhesion and the contact resistance at the interface between the current collector and the electrode. The other major function of the coating layer is to allow protection of the current collector, corrosion of current collectors being a fairly widespread phenomenon.

The coating layers may be deposited on one or both sides of the metal strip, and all or part of each of the faces. The term "coated" thus covers cases where the strip is completely coated and cases where the strip is partially coated.

It should be noted that the characteristics of the coating layers, thickness, pattern, chemical composition, may vary from one face to another, or even vary on the same face.

The coating is made of a material that is distinct from the material of the substrate.

In particular, metal particles may be present in the coating material.

Such particles may have any type of shape. Preferably, the particles are spherical.

For each particle, a diameter is defined as the maximum distance between two points on the surface of the particle.

The diameter is, for example, measured by a laser granulometry technique.

The laser diffraction particle size measurement technique measures particle size distribution by measuring the angular variation in scattered light intensity as a laser beam passes through a sample of dispersed particles. Large particles scatter light at small angles to the laser beam, and small particles scatter light at higher angles.

Among the particles of the first composition C1, the diameter of each particle is less than or equal to 100 microns.

Preferably, the particles are nanoparticles.

Nanoparticles are particles of which each dimension is less than 100 nanometers

In terms of chemical composition, many possibilities for the coating material are conceivable.

The coating material comprises, for example, a conductive material.

Many materials may be used for the conductive material: examples of conductive material include, in a nonlimiting manner, conductive carbons, carbon blacks, graphites, graphenes, carbon nanotubes, activated carbon fibers, unactivated carbon nanofibers, metal flakes, metal powders, metal fibers and electrically conductive polymers or mixtures thereof.

Preferably, the coating material comprises a binder material and conductive particles.

Many materials may be used for the binder material as long as the binder material is inert with respect to the materials used for the electrode.

The binder material is usually a polymeric material, which facilitates the handling of coatings during their manufacture.

Examples of binding materials include, in a nonlimiting manner, polytetrafluoroethylenes, polyvinylidene fluorides (also referred to as PVF 2 or PVDF), ethylene-propylene-diene rubbers (also referred to as EPDM), polyethylene oxides (also referred to as PEO), ultraviolet-curable acrylates, ultraviolet-curable methacrylates, and heat-curable divinyl ethers and their analogs.

Other suitable binder materials include crosslinked polymers, such as polymers chosen from polymers having carboxyl groups and crosslinking agents.

More generally, the binder material is a material consisting of one or more polymers selected from thermoplastic polymers, thermosetting polymers, elastomers, and mixtures thereof.

As examples of thermoplastic polymers, mention may be made of polymers resulting from the polymerization of aliphatic or cycloaliphatic vinyl monomers, such as polyolefins (including polyethylenes or polypropylenes). Also polymers resulting from the polymerization of vinyl aromatic monomers, such as polystyrenes, polymers derived from the polymerization of acrylic monomers and/or (meth) acrylates, polyamides, polyetherketones and polyimides.

Thermosetting resins such as epoxy resins, polyester resins mixed with polyurethanes or with polyether polyols are examples of thermosetting polymers.

By way of illustration, the elastomeric polymers include natural rubbers, synthetic rubbers, styrene-butadiene copolymers (also referred to as SBR) and ethylene-propylene copolymers (also referred to as EPM) or silicones.

The binder material content in the coating is preferably greater than or equal to 30% by weight.

On the other hand, in some cases, the coating may include one or more types of conductive additives to improve the electronic conductivity.

Examples of conductive additives include, but are not limited to, conductive carbons, graphites, graphenes, carbon nanotubes, activated carbon fibers, unactivated carbon nanofibers, metal flakes, metal powders, metal fibers and electrically conductive polymers.

The amount of conductive additives, if present, is greater than 10% by weight of the coating.

The coating has a thickness of between 10 nanometers (nm) and 100 µm, preferably in the range 0.5 µm to 5 µm.

The coating layer is deposited on the strip by printing methods including in particular screen printing, flexography, gravure, offset or inkjet printing, which makes it possible to apply coatings of compositions based on metal particles.

Because of this relatively small thickness, the coating is often referred to as a "film".

In some cases, the coating extends over the entire surface of the substrate. However, advantageously, the coating does not extend over the entire surface of the substrate: in fact, the coating may be so formed that the metal strip remains uncoated at its edge regions or in the center of the sheets.

The successive alternation of coated and uncoated areas on one of the faces of the metal strip defines the pattern. The uncoated areas at the edge of the strip are called the margins, the uncoated areas framed by two coated areas are called interbands. The width of the margins and interbands is variable.

In the frame of manufacture of the collector, a metal strip coil, i.e. a strip roll, is first manufactured. Then, the manufacture of a coated strip is achieved by continuously depositing coating layers on the substrate (the metal layer), namely the surface(s) of a coil of metal strip that is being unwound continuously.

When the strip has a coated band and two margins on both edges of the metal strip, the strip is considered to be a finished product. Conversely, in the presence of one or more interbands, the strip is considered to be a semi-finished product, the strip being intended to generate several finished products.

Whether the product is a finished or semi-finished product, the diversity of current collector coil lengths makes it necessary to be able to mechanically connect the transverse ends of two products. Such an operation is referred to as transverse splicing.

The transverse splicing operation is useful for various cases occurring in practice. Among these cases, mention may be made of the situation in which the length of the metal strip coils is less than the expected length for the product or to ensure the loading of the continuous strip machine, the case corresponding to the need to remove a part of the strip due to the non-compliance of the part with the quality criteria, breakage of the metal strip coil during the removal operation of the coating(s). Another case is that of adding a piece of metal strip, having a protective or aesthetic function, preferably uncoated, connected to the transverse end at the end of the finished or semi-finished product coil (commonly referred to as a "trailer"), but also a piece of metal strip connected to the transverse end at the beginning of the coil (commonly referred to as a "leader").

It is desirable that such an operation for connecting two metal strips, at least one of which is coated, should be as effective as possible from the point of view of the quality of the connection but also relative to its implementation throughout the manufacturing of a current collector.

Several techniques exist for performing a splicing operation involving metal strips.

It is known to first perform a chemical, mechanical or other ablation of the coatings of all the faces and then to perform an ultrasonic welding of the two stripped portions of metal strip thus obtained.

However, such a technique poses multiple problems.

On the one hand, the ablation operation is a significant operation in terms of equipment and operational modalities negatively impacting the effectiveness of the splicing operation.

In addition, the most obvious option, namely chemical ablation by solvents, presents a significant risk of pollution and therefore degradation of the quality of the finished or semi-finished product. On the other hand, chemical ablation is inefficient for some chemical natures of the coating.

Another known technique is to apply an adhesive substance or an adhesive tape on one or two faces at each end of the strip to be connected. The application is implemented transversely to the length of the strip. On the one hand, the use of an adhesive tape ensures good mechanical strength and, on the other hand, ensures good electrical continuity between the metal parts.

However, this technique has several disadvantages affecting the quality of finished and semi-finished products and the full viability of their transformation. In practice, the use of adhesive for the splicing operation proves tedious and complex, and therefore significantly impacts the production operations of the coated strip. The defects are detailed below.

Given the tensile force exerted during the laying of the generally plastic substrate of the adhesive tape and its natural removal after deposition, longitudinal wrinkle defects appear in the connection area.

In addition, in some cases, the material of the adhesive strip is incompatible with the temperature resistance required for the manufacture of the strip, which involves a high risk of breakage during operations implemented after the splicing operation.

In addition, there is a risk of pollution of other operations because the material of the adhesive tape represents chemically a foreign body.

Finally, an extra thickness at the splicing zone between the two strips corresponding to the thickness of the adhesive strip is generated. This runs the risk of alteration, in particular embossing the strips.

The applicant has thus identified that the improvement of the method of manufacturing a collector involves determining a method of connection between a metal element and a metal strip coated with a coating that is simpler to implement and improves the quality of the connection between the metal element and the coated metal strip.

This led the applicant to test many alternatives.

In particular, unsuccessfully, the applicant has tested laser welding, assembly by soldering, welding by application of magnetic pulses, surface leaching by laser ablation or leaching by applying ultrasonic waves.

None of these tests led to a satisfactory connection process from an industrial point of view.

Only ultrasonic welding makes it possible to obtain a homogeneous connection, a sufficient tensile strength, and to solve the problems of the techniques tested by the applicant.

According to particular embodiments, the manufacturing method comprises one or more of the following characteristics, taken in isolation or in any technically feasible combination:

during the application step, a welding between a non-metallic material and the strip is achieved in at least a part of the superimposing surface.

during the superimposing step, the superimposing strip comprises at least a part of the coating, and during the applying step, the line along which the ultrasound are applied by the sonotrode on the superimposing surface comprises at least a part of the coating.

the metal strip is coated with a coating sur at least a part of an area named the coated area, the coating being coated on the strip and, during the superimposing step, the superimposing surface comprising at least a part of the coated area.

the coating material comprises a binder material of a polymeric nature.

the coating material consists in at least particles.

the coating material comprises at least a polymer and particles.

the coating material consists of at least a polymer and particles.

the coating material comprises at least a binder and particles.

the coating material consists of at least a binder and particles.

the coating material comprises particles dispersed in at least a binder.

the coating material consists of particles dispersed in at least a binder.

the coating material comprises a binder material of a polymeric nature.

during the soldering step, the ultrasounds applied have a frequency of between 40 kilohertz and 100 kilohertz.

the strip has a thickness, the thickness of the strip being between 5 µm and 20 µm.

the coating has a thickness of between 10 nm and 100 µm.

the strip has a succession along an axis of coated and uncoated areas forming a pattern, the superimposing surface thus having a succession of coated and uncoated areas, the application step being characterized by a set of parameters, the set of parameters being different when the application step concerns a coated zone and when the application step concerns an uncoated zone.

the method further comprises a step of detecting the coated zones.

the metal element is a metal strip, a coated metal strip or a contact point.

The present description also relates to a splicing bench comprising a device for connecting a metallic element and a metal strip coated with a coating, the coated metal strip being intended to form a current collector, the coating being produced from a coating material, the coating material being distinct from the strip material, the device comprising a support member on which the coated strip and the metal member are superimposed on a superimposing surface, and an ultrasonic welder comprising a clean sonotrode to apply ultrasound to weld the superimposing surface along a line.

According to a particular embodiment, the splicing bench further comprises a sensor for detecting in real time, variations in nature, appearance and structure, and, in particular, the presence or absence of a coating, of the zone located under the sonotrode.

The present description also relates to a current collector obtained after implementation of the manufacturing method described above.

The present description also relates to a system, particularly a battery or supercapacitor, comprising a current collector as previously described.

BRIEF DESCRIPTION OF THE DRAWINGS

Other features and advantages of the invention will become apparent upon reading the following description of embodiments of the invention, given by way of example only and with reference to the drawings, wherein.

DETAILED DESCRIPTION OF EMBODIMENTS

Figure 1:
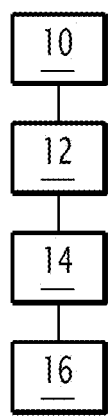
FIG. 1 shows a flowchart of an exemplary implementation of a method for manufacturing a current collector comprising a connection phase.

An example of a method of manufacturing a battery current collector is now described with reference to FIG. 1 which illustrates a flowchart for implementing said manufacturing method.

The manufacturing method comprises four phases: a production phase 10, a coating phase 12, a connection phase 14 and a finishing phase 16.

During the production phase 10, an uncoated metal strip is obtained.

In one example, the metal strip is purchased from a supplier.

Alternatively, the metal strip may be made from the metal.

During the coating phase 12, the metal strip is coated with a coating to obtain a coated metal strip 18.

As explained above, the coating is a homogeneous and continuous layer made of a material or mixture of materials having a relatively small thickness. It should be noted that the coating is characterized by its homogeneity and, in particular, the homogeneity of its thickness over its entire surface, its appearance (the presence of dewetting point, drying gradient, and other defects), its roughness and resolution of the borders of the film (or outlines of the film).

The coating may be formed through a wide range of techniques such as printing processes (flexography, gravure, offset, inkjet . . . ) and coating (slot die coating, curtain coating, knife coating, etc.). These manufacturing methods are compatible with large-scale production, which should preferably be carried out by continuous processes such as roll-to-roll processes.

Alternatively, spin coating is a widely used method of thin-layer deposition on a flat surface. This method consists in depositing a drop on a rotating plate, the drop then being spread by centrifugation, to form a layer.

Alternatively, a dip-coating method may be used to form the coating. This technique is based on a principle similar to centrifugal coating. But in this case, the substrate is soaked in the solution and is removed with at a controlled speed and angle.

Alternatively, another method called "doctor blading" may be used. According to this method, a razor blade is translated at a defined distance from the substrate for the purpose of spreading the coating material. The volume deposited, the speed of translation and the height of the blade make it possible to define the final thickness of the coating.

Other methods of dry deposition may be used: the coating may be formed by sputter coating, physical vapor deposition (PVD), melt extrusion, or polishing methods.

Figure 2:
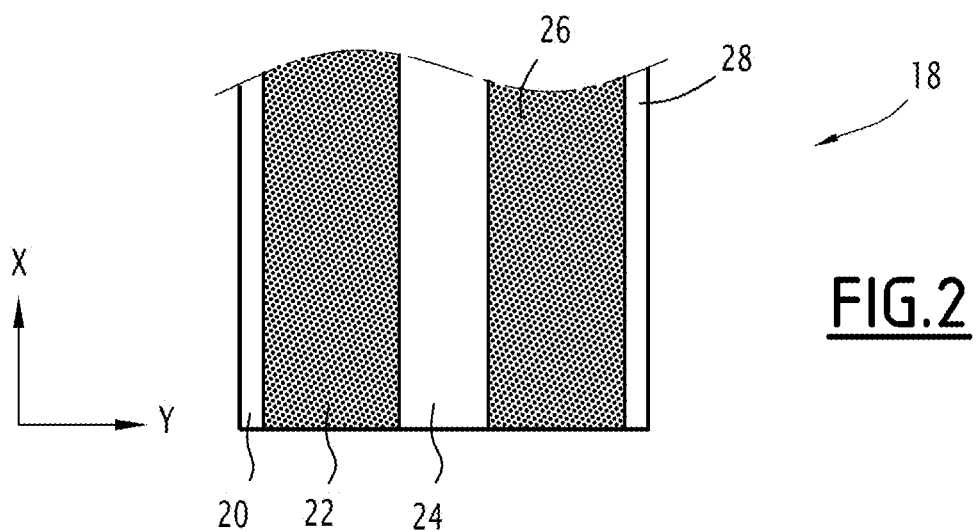
FIG. 2 shows a schematic view of an example of a coated metal strip intended to form a current collector.

At the end of the coating phase 12, one obtains the strip 18 intended to become a current collector of a battery shown in FIG. 2.

The strip 18 corresponds to a semi-finished product as described above. The preceding remarks apply here and are not repeated.

The strip 18 extends mainly in a longitudinal direction symbolized by an axis X in FIG. 2. There is also a transverse direction as a direction perpendicular to the longitudinal direction and contained in the plane of the strip 18. The transverse direction is symbolized by a Y axis in FIG. 2. Also, in the following, the longitudinal direction is referred to as longitudinal direction X, while the transverse direction is referred to as transverse direction Y.

In this field, the extension in the transverse direction Y of the strip 18 is referred to by the term width. The width depends on the strip 18 considered, the width is generally between 50 millimeters (mm) and 1200 mm.

The pattern of the strip 18 in the case shown is a pattern with a single interband, i.e. that extending in the longitudinal direction from one end to the other of the strip 18, wherein there is successively a first margin 20, a first coated strip 22, an interband 24, a second coated strip 26 and a second margin 28.

During the connection phase 14, the aim is to connect this metal strip 18 to a metal element.

By way of example, the metal element may be another metal strip 18 coated or not.

According to another embodiment, the metal element may be a contact point 72.

In each case, the difficulty is that the assembly to be connected has a pattern along the transverse axis.

First of all, the case of a connection to a coated metal strip 18 identical to the metal strip 18 of FIG. 2 is illustrated. It is then a transverse splicing.

The metal strip 18 of FIG. 2 is referred to as "the first strip 18_1" in the sequence while the other metal strip 18 is referred to as the "second strip 18_2".

In order to connect the two strips 18, a splicing bench 30 provided with a connection device is used.

Figure 3:
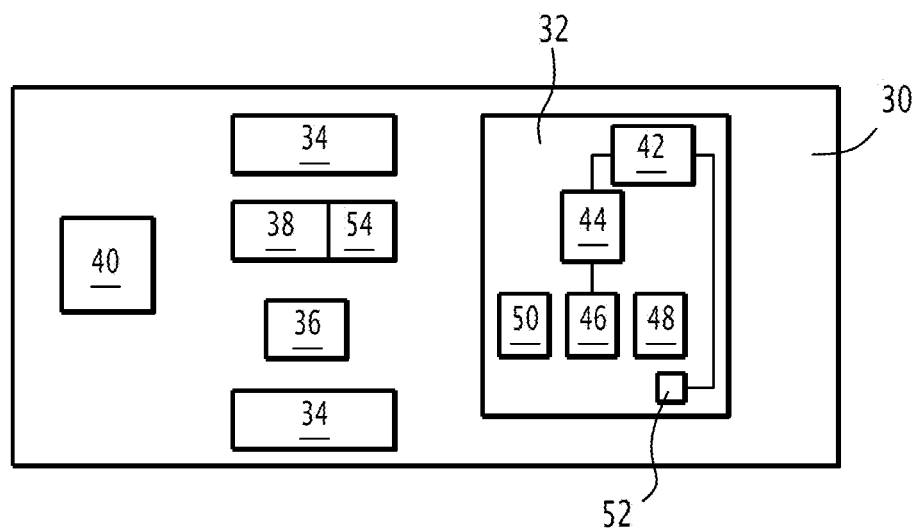
FIG. 3 shows a block diagram of an example of a splicing bench comprising a sonotrode.

The splicing bench 30 is shown in block diagram form in FIG. 3.

The splicing bench 30 comprises an ultrasonic welder 32, coil carriers 34, an anvil 36, a support member 38 and a controller 40.

The welder 32 comprises an ultrasonic source 42, an amplifier 44, a rotary sonotrode 46, a jack 48, a displacement member 50 and a sensor 52.

Other welders 32 exist, including welders 32 provided with different sensors 52.

The ultrasonic source 42 is suitable for applying ultrasonic waves to the sonotrode 46, the ultrasonic waves having an adjustable frequency and amplitude.

The ultrasonic source 42 may be, for example, a piezoelectric transducer.

The frequency of the applied ultrasonic waves is typically between 20 kilohertz (kHz) and 100 kHz.

Preferably, the frequency of the applied ultrasonic waves is greater than 40 kHz.

The amplifier 44 amplifies the amplitude of the ultrasonic waves applied by the ultrasonic source 42.

The amplifier 44 is often referred to as a "booster".

The sonotrode 46 is a metal piece which is excited by ultrasonic waves and resonates at the frequency of the ultrasonic wave by a mechanical contraction having an amplitude of a few micrometers. By contacting the sonotrode 46 with the surface to be welded, the sonotrode 46 allows a return of the electromagnetic energy of the ultrasonic waves to the surface to be welded in the form of ultrasonic vibration energy.

In the example, the displacement of the vibration of the sonotrode 46 takes place in a plane parallel to the plane defined by the longitudinal direction X and the transverse direction Y.

In this case, the sonotrode 46 vibrates at a frequency between 20 kHz and 100 kHz, preferably greater than 40 kHz. In the example described, without this being mandatory, the sonotrode 46 is devoid of engravings.

There is different type of sonotrode: the shape of the sonotrode 46 may be round, square, toothed or profiled.

Figure 4:
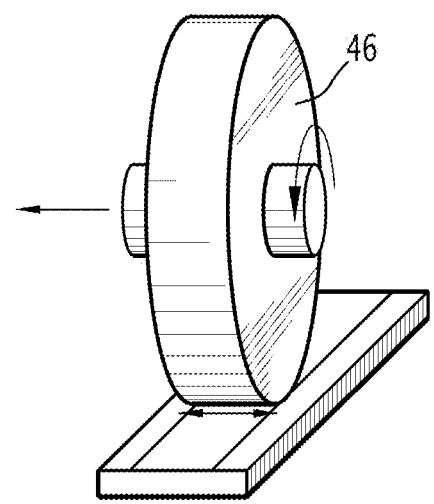
FIG. 4 shows a perspective view of the sonotrode of FIG. 3.

In this case, as shown in FIG. 4, the sonotrode 46 is in the form of a cylinder with a circular base.

The sonotrodes 46 are generally made of titanium, aluminum or steel.

The sonotrode 46 is further designed to rotate about an axis parallel to the longitudinal direction X or the transverse direction Y and perpendicular to its direction of travel.

The jack 48 is connected to the sonotrode 46 to ensure that the sonotrode 46 exerts a specific pressure on the elements to be welded, the pressure being between 1 bar and 5 bar.

Figure 5:
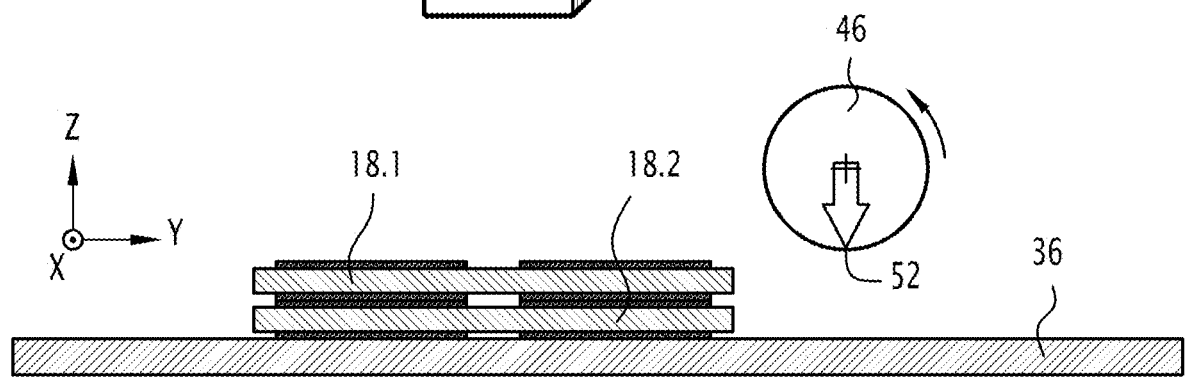
FIG. 5 shows a view of a part of the splicing bench.

The displacement member 50 is a member adapted to move the sonotrode 46 in translation as shown in FIG. 5.

The displacement member 50 defines a stroke for the sonotrode 46, the track being a line corresponding to the weld bead to be produced, the line being in this case parallel to the transverse direction Y.

The displacement member 50 is further able to control the speed of movement of the sonotrode 46, the speed being between 0 and 5 m/min.

The sensor 52 is able to detect changes in nature, appearance and structure of the strip 18, and in particular the presence or absence of a coating. This detection may be performed in real time.

More specifically, the sensor 52 is able to detect a transition between coated zones and uncoated zones of the strip 18 as well as the ends of a strip 18.

In a particular example, the sensor 52 is an optical sensor which comprises a light source, optical fibers for transporting light to and from the detection zone and a photodetector. The light source illuminates the strip 18 at a fixed power via an optical fiber. The light reflected by the strip 18 is sent to the photodetector via another optical fiber. The intensity of the output signal of the photodetector retranscribes the absorption of light by the strip 18. The presence of a coating modifies the amount of light transmitted to the photodetector, which allows the detection of the presence of a coating.

The reel holders 34 are cylinders each of which is suitable for carrying a strip 18 arranged in the form of a reel. In this case, the splicing bench 30 comprises two reel holders 34, a first reel holder 34 for the first strip 18 and a second reel holder 34 for the second strip 18.

The anvil 36 is a bearing surface having a length at least equivalent to the stroke of the sonotrode 46.

The anvil 36 is, for example, made of steel and has a ground surface.

The anvil 36 is arranged so that when the sonotrode 46 is in operation, the sonotrode 46 and the anvil 36 face each other.

The support member 38 is a support surface for the strips 18 to be joined.

The support member 38 is provided with at least one holding member 54, each holding member 54 being designed to hold strips 18.

The holding member 54 is, for example, a pneumatic member.

Alternatively, the holding member 54 may be a mechanical member using a clamping force similar to a vice.

The assembly of holding devices is sometimes referred to as the "press".

The controller 40 is designed to control the different elements of the splicing bench 30.

More specifically, the controller 40 controls the set of parameters or parameter set applied during welding performed on the splicing bench 30.

The parameter set is a set of two types of parameters.

The first type of parameter set groups the parameters characterizing the ultrasonic oscillation applied to the surface to be welded.

Any parameter making it possible to characterize the ultrasonic oscillation is conceivable. The simplest is to consider the vibration frequency and the vibration amplitude of sonotrode 46.

The second type of parameter set groups the parameters characterizing the scanning by the sonotrode 46 of the zone to be welded.

The speed of the sonotrode 46 in rotation, the speed of displacement of the sonotrode 46 in translation, and the pressure of the sonotrode 46 are examples of such parameters.

Figure 6:
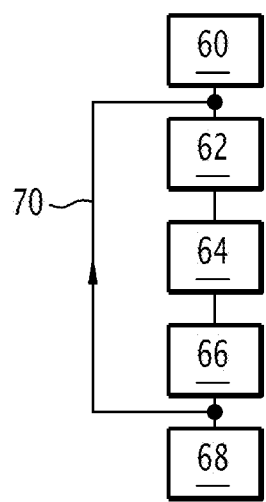
FIG. 6 shows a flowchart of an exemplary implementation of the connection phase of FIG. 1.

The use of the splicing bench 30 allows the implementation of the connection phase 14 of the two strips 18 which is now described with reference to FIG. 6.

The connection phase 14 comprises a superimposing step 60, an optical detection step 62, an application step 64, a displacement step 66 and a cleaning step 68.

It should be noted that, during the connection phase 14, the aforementioned order of the steps does not imply an order of implementation of the steps. In particular, the cleaning step 68 may be implemented at the end of the process or simultaneously with one of the other steps 60, 62, 64 or 66 or between one of the aforementioned steps.

During the superimposing step 60, the strip 18 and the metal member are superimposed on an overlapping surface.

The superimposing surface is held on the support member 38 at the level of the anvil 36.

The support member 38 is, according to the example described, a support table corresponding to a planar superimposing surface.

Alternatively, the support member 38 may be such that the superimposing surface is not flat, but typically cylindrical.

During the optical detection step 62, the sensor 52 detects the nature of the area of the superimposing surface (coated or uncoated).

For this, the optical sensor 52 receives light from the area.

Depending on the amount of light received, the optical sensor 52 determines whether the surface is coated or not. More specifically, when the amount of light received is small, the optical sensor 52 indicates that the surface is coated and, reciprocally, when the amount of light received is large, the optical sensor 52 indicates that the surface is uncoated.

During the application step 64, the sonotrode 46 is placed in contact with the determined zone and applies ultrasound to the determined zone. All of these actions respect a specific set of parameters as previously defined.

The parameter set depends on the nature of the determined zone.

This means that the set of parameters is different when the application step 64 relates to a coated zone and when the application step 64 relates to an uncoated zone.

The adjustment of the set of parameters is performed by the controller 40 as a function of the detection made by the optical sensor 52 so that the adjustment is autonomous for the operator.

From a physical point of view, the ultrasonic wave generates a vibration allowing, in a localized manner, the translation of the metal strips 18 with respect to one another. The surface roughness of the two strips 18 generates a friction phenomenon, locally causing a rise in temperature sufficient to cause intermolecular recombination of the two strips 18 upon cooling, thereby creating a weld.

During the displacement step 66, the sonotrode 46 is moved by the alignment device.

Preferably, the sonotrode 46 is moved along a straight line to form a rectilinear and continuous weld bead.

In the proposed case, the sonotrode 46 is moved along a line parallel to the transverse direction Y.

The steps of optical detection, application and displacement are repeated until the end of the pattern of the first strip 18. This iterative aspect is shown by the arrow 70 in FIG. 6.

Splicing of the two strips 18 having a weld seam or a weld line is thus obtained.

During the cleaning step 68, the sonotrode 46 is cleaned using a laser.

The exposure of the sonotrode 46 to the laser makes it possible to degrade and thermally remove the deposits accumulated on the sonotrode 46.

Preferably, the laser has a beam size greater than or equal to the largest dimension of the sonotrode 46, in order to treat the entire surface of the sonotrode 46 in contact with the strips 18 to be spliced, this specific surface of the sonotrode 46 is often called a tread.

This prevents clogging of the tread by the coating. The cleanliness of the sonotrode 46 is thus guaranteed throughout the connection phase 14. This ensures the continuity of the effectiveness of the sonotrode 46, and therefore the homogeneity of the weld quality all along the weld seam.

In a variant, the cleaning is carried out by a mechanical technique.

For example, a doctor blade may be employed by positioning it flush with the tread of the sonotrode 46.

In another example, an abrasive surface may be used. To facilitate the use of the abrasive surface, it is mounted on a clean wheel to rotate in a direction opposite to the direction of rotation of the sonotrode 46. The abrasive surface may also be mounted on a fixed tool.

Another mechanical technique is to generate a rotational speed differential of the sonotrode 46 and the speed imposed by the alignment device. This makes it possible to generate a phenomenon of friction at the level of the tread of the sonotrode 46 to eliminate the residues of the coating layer.

According to another variant, the cleaning may be carried out using a chemical technique by applying a product destroying the coating. The term "stripping" is often used in this case.

According to yet another variant, the cleaning may be carried out by combining several of the previous techniques, including techniques of different types.

During the finishing phase 16, the product thus obtained is made to the dimensions required for the desired application.

A current collector is thus obtained.

The current collector manufacturing method that has just been described is easier to implement and improves the quality of the current collector.

This follows, in particular, from the advantages provided by the connection phase 14.

The connection phase 14 allows, in particular, a connection having a reduced thickness to be obtained between the two strips 18.

In fact, the weld bead obtained has a thickness much less than the thickness of an adhesive tape.

It should also be noted that performing ultrasonic welding is much faster than placing an adhesive.

The ability to detect the characteristics of the substrate in the area to be welded, coated/uncoated in particular, allows the adjustment in a real-time manner of the parameters used for welding.

This tailored and real-time adjustment to the nature of the substrate in contact with the sonotrode 46 makes it possible, in the case of transverse splicing, to guarantee a similar weld quality at all points of the weld line, in particular at least equivalent to 60% of the breaking strength of a seamless aluminum strip 18, preferably 80%. Such a breaking strength corresponds to a breaking strength sufficient for application to collectors.

Figure 7:
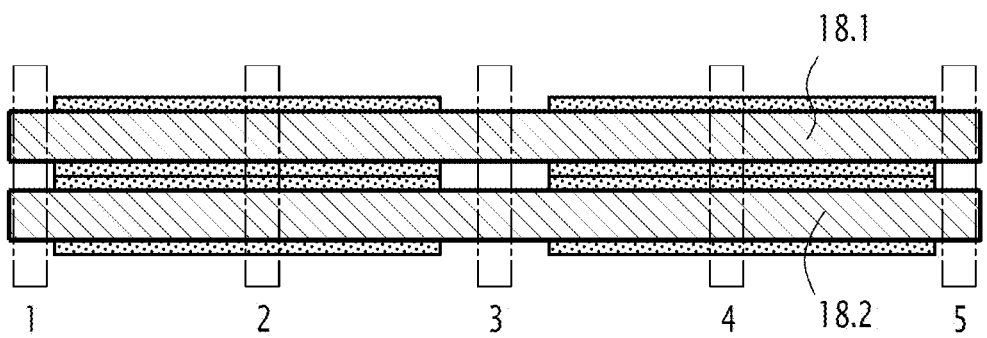
FIG. 7 shows a schematic view of the sampling locations of an example of coated metal strip.

The good resistance to breakage of the bonded strip 18 has been demonstrated experimentally by tests of the applicant. These tests are described below with reference to FIG. 7.

The tests were carried out on strips 18 similar to the strip 18 of FIG. 2. The strips 18 are aluminum strips coated with a coating layer on both surfaces in a margin/coating/interband/coating/margin pattern. In addition, the strips 18 have a thickness of 12 µm.

The coating layer is formed by depositing a carbon-based material (70% by weight of thermoplastic polymer and 30% by weight of carbon black) in the form of a thin layer on the same aluminum strip. The thickness of the coating after drying is between 1 µm and 1.5 µm.

After implementation of the splicing, samples are taken at each of the margins, each of the coatings and the interband. The samples each have a width of 15 mm and a length of 160 mm.

These samples are numbered sequentially from 1 to 5. By traversing the strip 18 welded along a line parallel to the transverse direction Y, the sample 1 corresponds to the first margin, the sample 2 corresponds to the first zone sample 3 corresponds to the interband, the sample 4 corresponds to the second coating zone, and the sample 5 corresponds to the second margin.

The tensile strength is a measure of the effort required to break a part and thereby is a means of characterizing the strength of a material.

In this case, the tensile strength is measured on each sample using a dynamometer. Samples 15 mm wide and 150 mm long are placed between the jaws of the dynamometer, traction exerted at a speed of 40 mm/min, to measure the maximum force in Newton before breaking the sample.

In addition and to avoid any bias, the measurement is performed on 10 separate samples, the final measurement corresponding to the arithmetic average of the different measurements obtained for the 10 samples.

The reference sample used is a sample of an aluminum strip having the same dimensions as the other samples.

The tensile strength measurements for each sample are presented in a standardized manner with respect to the reference sample in Table 1 which follows.

TABLE 1

Standardized value of tensile strength for five samples

| | Sample | | | | |
|---|---|---|---|---|---|
| | 1 | 2 | 3 | 4 | 5 |
| Measurement | 80% ± 4% | 78% ± 6% | 82% ± 3% | 79% ± 6% | 81% ± 5% |

It should be noted that the standardized value of the lowest resistance is 78%, which shows that the quality of the weld is of good quality at each location.

In addition, there is good homogeneity since the difference between the normalized maximum resistance value and the standardized minimum resistance value is only 4%.

The quality of the weld may also be checked by studying the state of the interface between the two strips 18, in the coated and uncoated areas. This study is shown in FIGS. 8 to 12.

Figure 8:
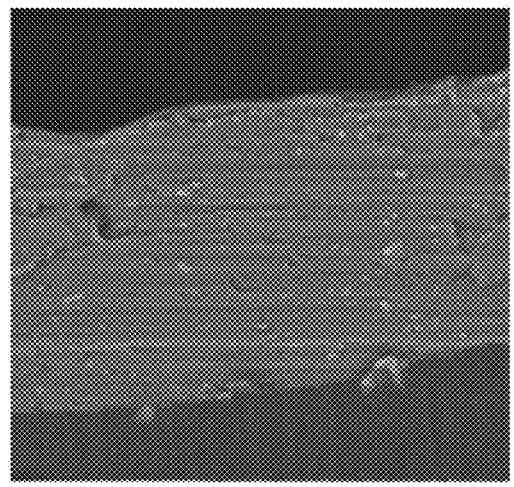
FIG. 8 shows a sectional view of an interband area after welding with a first set of parameters.

FIG. 8 corresponds to the sectional view of an interband area after welding with a first set of parameters. The first set of parameters is designed to achieve a good quality weld line in an uncoated area.

Figure 9:
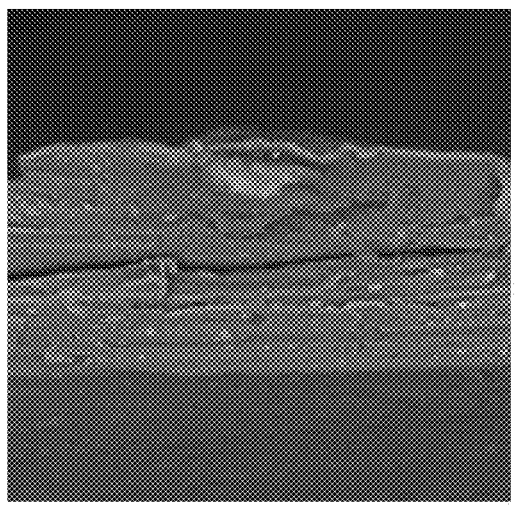
FIG. 9 shows a sectional view of the same interband area as the zone of FIG. 8 but before the welding operation.

FIG. 9 corresponds to the sectional view of the same interband area as the area of FIG. 8 but before the welding operation.

Figure 10:
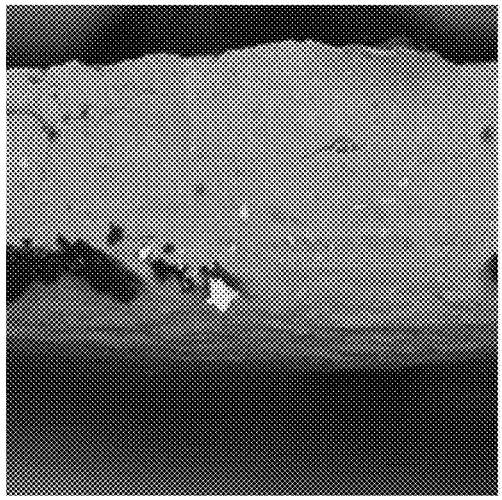
FIG. 10 shows a sectional view of an area corresponding to the first coating zone after welding with a second set of parameters.

FIG. 10 corresponds to the sectional view of an area corresponding to the first coating area after welding with a second set of parameters. The second set of parameters is designed to achieve a good quality weld line in a coated area. The second set of parameters is therefore distinct from the first set of parameters.

Figure 11:
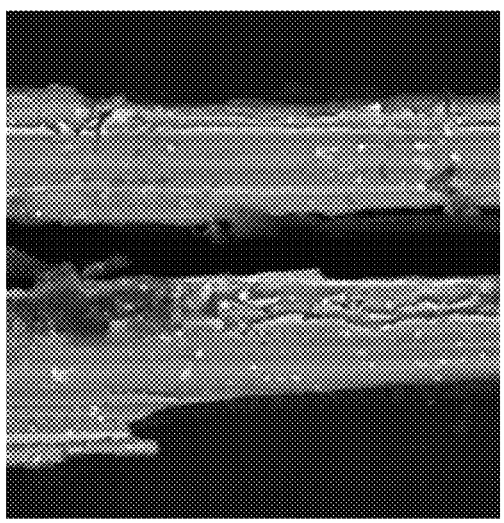
FIG. 11 shows a sectional view of the same zone as the zone of FIG. 10 but before the welding operation.

FIG. 11 is the sectional view of the same area as the area of FIG. 10 but before the welding operation.

Figure 12:
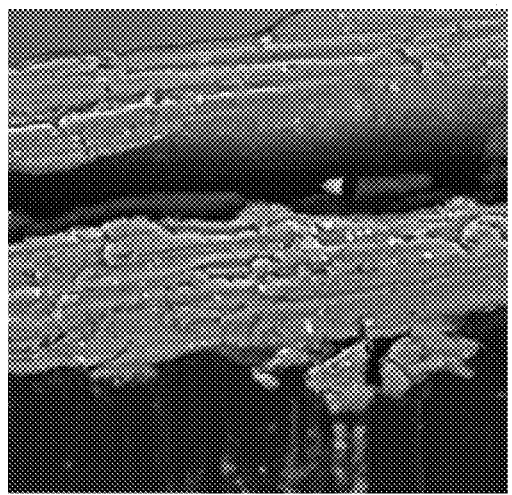
FIG. 12 shows a sectional view of an area corresponding to the area of FIG. 10 after welding with the first set of parameters.

FIG. 12 corresponds to the sectional view of an area corresponding to the area of FIG. 10 after welding with the first set of parameters, i.e. the set of parameters adapted for an uncoated area.

The comparison of FIGS. 8 and 9, on the one hand, (uncoated case) and the comparison of FIGS. 10 and 11, on the other hand, (coated case) makes it possible to highlight similar interfaces between the two metal strips 18, namely a complete recombination between the two metal masses. This observation is consistent with homogeneous tensile strength measurements noted with reference to Table 1.

The comparison of FIGS. 10 and 12 also shows the importance of applying specific sets of parameters since in FIG. 12, an absence of metal recombination is observed, and thus an absence of welding between the two strips 18.

These various tests show the good quality of the weld and therefore the method of manufacturing a current collector is simpler to implement and improves the quality of the current collector.

The method may be applied in a plurality of splicing situations because the alternation between the coated areas and the uncoated areas is well controlled.

Figure 13:
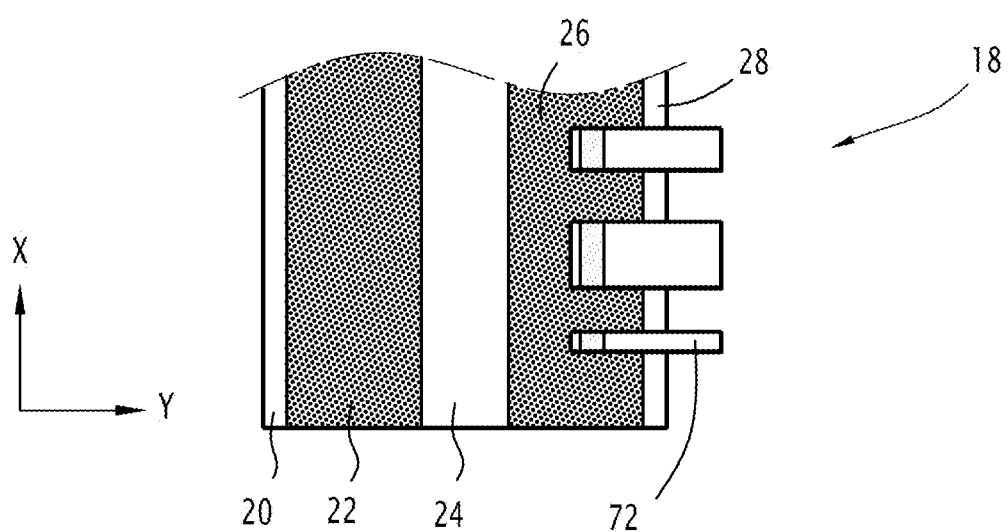
FIG. 13 shows a schematic representation of the configuration obtained at a step of implementing the connection method according to FIG. 6 when the connection is made between a coated metal strip and a contact point.

In particular, as illustrated in FIG. 13, the splicing phase may be applied for longitudinal splicing creating a direct physical contact between the metal substrate and each contact point 72 to be connected to ensure electrical continuity.

The contact point 72 is a strip 18 or a plate.

The material of the contact point 72 is variable in nature but preferentially identical to the uncoated metal of the strip 18.

The same advantages as above also apply in this case.

In addition, in each case, it is possible to produce several successive welding lines if this is necessary for the application.

In addition, it should be emphasized that the manufacturing method allows to achieve, during the application step, a weld between a non-metallic material and the strip on at least a portion of the superimposing surface.

This in particular avoids a step of removing the coating to perform only a metal-on-metal type welding by applying ultrasound.

More generally, the manufacturing method described for the current collector may be used to obtain any system comprising such a collector including a supercapacitor or a battery.

Alternatively, a combination of the preceding embodiments is also conceivable when it is technically feasible.

The invention claimed is:

1. A method of manufacturing a current collector for a battery or a supercapacitor, the manufacturing method comprising a phase of connecting a metal element and a metal strip coated with a coating, the coating being made of a coating material and the metal strip being made of a strip material, the coating material being distinct from the strip material, the connecting phase comprising:

a step of superimposing the strip coated with the coating and the metal element at an interface such that the interface of the strip and the metal element comprises at least part of the coating, and a step of applying ultrasounds with a sonotrode of an ultrasonic welder to the interface along a line for welding the interface such that the resulting weld comprises the at least part of the coating, wherein the strip has a succession of coated and uncoated areas forming a pattern along an axis, the interface thus having the succession of coated and uncoated areas, wherein the step of applying ultrasounds includes performing a weld along a line on the coated areas based on a first set of parameters, and performing a weld along a line on the uncoated areas based on a second set of parameters, the first set of parameters being distinct from the second set of parameters, each of the first set of parameters and the second set of parameters controlling the energy delivered to the respective coated and uncoated areas on which the sonotrode applies ultrasounds, the method comprising a step of detecting the coated areas and controlling the sonotrode with the first set of parameters when the step of applying ultrasounds is carried out upon detecting the coated areas and controlling the sonotrode with the second set of parameters when the step of applying ultrasounds is carried out upon detecting the uncoated areas.

2. The method of manufacturing according to claim 1, wherein the coating material comprises a non-metallic material, and wherein during the step of applying ultrasounds, a weld between the non-metallic material and the strip is achieved in at least a part of the interface.

3. The method of manufacturing according to claim 1, wherein the coating material comprises a polymeric binder material.

4. The method of manufacturing according to claim 1, wherein the coating material comprises particles dispersed in at least a binder.

5. The method of manufacturing according to claim 1, wherein during the step of applying ultrasounds, the ultrasounds have a frequency of between 40 kiloHertz and 100 kiloHertz.

6. The method of manufacturing according to claim 1, wherein the strip has a thickness, the thickness of the strip being between 5 microns and 20 microns.

7. The method of manufacturing according to claim 1, wherein the coating has a thickness between 10 nanometers and 100 micrometers.

8. The method of manufacturing according to claim 1, wherein the metal element is at least one of a metal strip, a coated metal strip or a contact point.

\* \* \* \* \*